Joseph Chellew's Elevated Adjustable Draught Bar for Harrows
117149          PATENTED JUL 18 1871
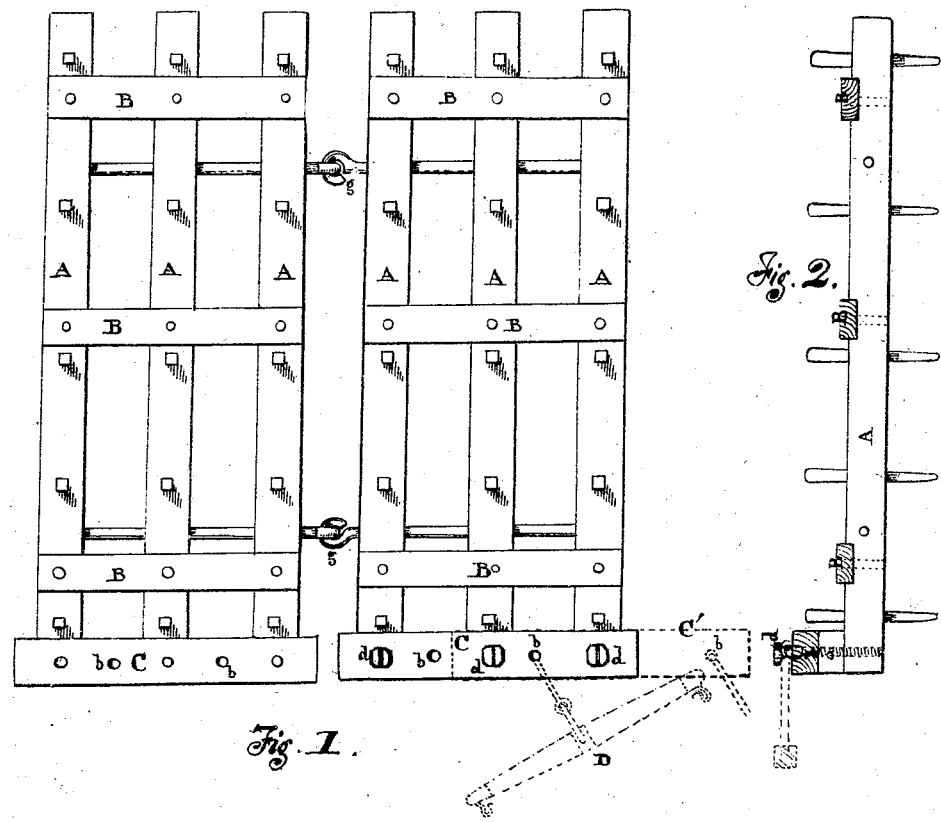
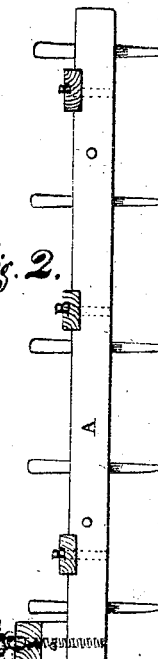
Fig. 1.     Fig. 2.
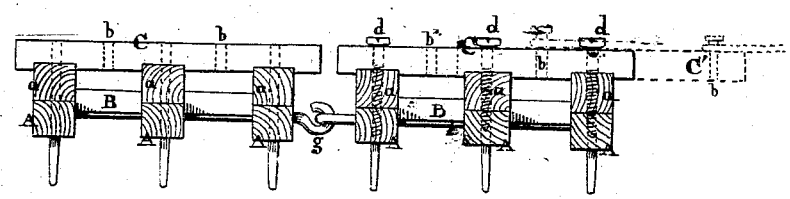
Fig. 3
Witnesses
E. Thurlow
A. A. Howard
Joseph Chellew
Inventor

UNITED STATES PATENT OFFICE.

JOSEPH CHELLEW, OF GLASFORD, ILLINOIS.

IMPROVEMENT IN HARROWS.

Specification forming part of Letters Patent No. 117,149, dated July 18, 1871.

*To all whom it may concern:*

Be it known that I, JOSEPH CHELLEW, of Glasford, in the county of Peoria and in the State of Illinois, have invented an Improvement in Harrows; and do hereby declare that the following is a full, clear, and exact description thereof, reference being had to the annexed drawing making a part of this specification, in which like letters of reference refer to like parts, and in which—

Figure 1 represents a plan; Fig. 3, a front elevation; Fig. 2, a side elevation.

This invention consists in the attachment, to an ordinary harrow, of an elevated horizontal bar to the front end of the same, made adjustable, so as to be projected, if necessary, beyond the side of the harrow, and to which the draft is attached, by which adjustment the advance of the harrow, either broadside or more angularly, is controlled. The bar for this purpose is pierced with several holes for a bolt or clevis to which to attach the single-tree. By the elevation of this bar the tendency of the harrow to have its fore part and teeth continually pulled out of the soil, consequent on the usual mode of attaching the draft, is obviated.

A A A, &c., are the "heads" or "fore-and-aft" bars of what is called a "diamond-harrow," from its oblique construction, and in which the teeth are inserted. It is made in two folding sections hinged together along the center at $g\ g$. B B B, &c., are cross-braces. C is an elevated bar, set on blocks resting on the front ends of the fore-and-aft bars A A A, &c., above the general surface of the implement. The blocks $a\ a\ a$ just mentioned may be substituted by other devices for elevating the bar, and the latter may be attached to but one section of the harrow, if the latter is in sections. A bolt or bolts, $d\ d\ d$, or equivalent means, is employed to adjust and secure the bar C above the blocks $a\ a\ a$, passing through both bar and block into or through the harrow, and are made removable so as to adjust the bar either to the left or right. Several holes $b\ b$ pierce the bar C for the attachment of the clevis-bolt or draft. The dotted lines represent the single-tree D; also, the extension of the bar to the right hand $C'$, thus changing the draft to a distance beyond the angle of the harrow.

The operation of this device is as follows: The elevated draft-bar C may be attached in any convenient way to any harrow now in use, and, by means of the same bolts $d\ d\ d$, it can be adjusted in a position more to the left or to the right, as is necessary in harrowing, for the purpose of causing the teeth of the implement to track closer together or further apart for coarse or fine work. The attachment of the draft to the elevated bar C causes the harrow to work constantly with its front teeth in the soil, doing its full work instead of being continually raised out of the ground, as in the ordinary mode of harrowing when the draft is attached to too low a point.

What I claim as my invention is—

The arrangement of the elevated adjustable draft-bar C, provided with the holes $b\ b\ b$ for attachment of draft-bolts $d\ d\ d$ and blocks $a\ a\ a$, substantially in the manner and for the purpose as shown and described.

In testimony that I claim the foregoing improvement in harrows I have hereunto set my hand this 4th day of February, 1871.

JOSEPH CHELLEW.

Witnesses:
 E. THURLOW,
 A. A. HOWARD.